United States Patent
Mesuda et al.

(10) Patent No.: US 11,299,659 B2
(45) Date of Patent: Apr. 12, 2022

(54) ANTI-STATIC AGENT, AND COMPOSITION FOR MOLDING AND CROSSLINKABLE COMPOSITION IN WHICH SAME IS USED

(71) Applicant: ZEON CORPORATION, Tokyo (JP)

(72) Inventors: Ikuya Mesuda, Tokyo (JP); Keisuke Ota, Tokyo (JP); Yohei Tateishi, Tokyo (JP); Shigetaka Hayano, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 166 days.

(21) Appl. No.: 16/484,588

(22) PCT Filed: Feb. 14, 2018

(86) PCT No.: PCT/JP2018/005111
§ 371 (c)(1),
(2) Date: Aug. 8, 2019

(87) PCT Pub. No.: WO2018/151162
PCT Pub. Date: Aug. 23, 2018

(65) Prior Publication Data
US 2020/0040241 A1 Feb. 6, 2020

(30) Foreign Application Priority Data
Feb. 15, 2017 (JP) .............................. JP2017-026303

(51) Int. Cl.
| | |
|---|---|
| *C09K 3/16* | (2006.01) |
| *C08L 9/06* | (2006.01) |
| *C08G 65/333* | (2006.01) |
| *C08L 19/00* | (2006.01) |
| *C08L 23/12* | (2006.01) |
| *C08L 33/08* | (2006.01) |
| *C08L 67/02* | (2006.01) |

(52) U.S. Cl.
CPC .......... *C09K 3/16* (2013.01); *C08G 65/33306* (2013.01); *C08L 9/06* (2013.01); *C08L 19/00* (2013.01); *C08L 23/12* (2013.01); *C08L 33/08* (2013.01); *C08L 67/02* (2013.01)

(58) Field of Classification Search
None
See application file for complete search history.

(56) References Cited

U.S. PATENT DOCUMENTS

| | | | |
|---|---|---|---|
| 4,156,775 A * | 5/1979 | Evani | C08G 65/32 162/164.3 |
| 4,198,269 A * | 4/1980 | Evani | C08G 65/33306 162/164.3 |
| 10,199,683 B2 * | 2/2019 | Hayano | H01M 10/0565 |
| 2003/0149158 A1 * | 8/2003 | Klun | C08L 71/02 524/462 |
| 2014/0138589 A1 * | 5/2014 | Hayano | C08G 65/24 252/511 |
| 2015/0270572 A1 * | 9/2015 | Hayano | H01M 8/1025 429/317 |
| 2019/0177477 A1 | 6/2019 | Ota et al. | |
| 2020/0040241 A1 * | 2/2020 | Mesuda | C08L 9/06 |

FOREIGN PATENT DOCUMENTS

| | | |
|---|---|---|
| CN | 109476907 A | 3/2019 |
| EP | 2 902 430 A1 | 8/2015 |
| EP | 3 505 568 A1 | 7/2019 |
| JP | 547-042270 A | 12/1972 |
| JP | 552-093500 A | 8/1977 |
| JP | H09-013013 A | 1/1997 |
| JP | 2010-285629 A | 12/2010 |
| JP | 2013-256499 A | 12/2013 |

OTHER PUBLICATIONS

Nov. 24, 2020 Extended Search Report issued in European Patent Application No. 18753654.5.
May 22, 2018 Search Report issued in International Patent Application No. PCT/JP2018/005111.
Aug. 20, 2019 International Preliminary Report on Patentability issued in International Patent Application No. PCT/JP2018/005111.

\* cited by examiner

*Primary Examiner* — Peter A Salamon
(74) *Attorney, Agent, or Firm* — Oliff PLC

(57) ABSTRACT

An anti-static agent containing a polyether compound having a cationic group is provided. According to the present invention, an anti-static agent can be provided which has excellent compatibility with a resin material and a rubber material as well as excellent anti-static properties.

11 Claims, No Drawings

ANTI-STATIC AGENT, AND COMPOSITION FOR MOLDING AND CROSSLINKABLE COMPOSITION IN WHICH SAME IS USED

TECHNICAL FIELD

The present invention relates to an anti-static agent having excellent compatibility with a resin material and a rubber material as well as having excellent anti-static properties, and a composition for a formed product and a cross-linkable composition prepared by using such an anti-static agent.

Various resin materials and rubber materials have been used as members for electronic devices recently, and also have been used as members necessary for production of these electronic devices. Meanwhile, resin materials and rubber materials used in production of electronic devices and the like may cause malfunctions due to suction of surrounding dirt by static electricity, electrostatic discharge damage, and the like. Thus, these resin materials and rubber materials are required to have excellent anti-static properties. These resin materials and rubber materials are also used for packaging electronic devices, and in such cases, the materials are also required to have excellent anti-static properties.

As a method for imparting anti-static properties to resin materials and rubber materials, a method for compounding an anti-static agent is commonly used. For example, known is a method in which an ionic liquid having an organic cation is used as an anti-static agent to be compounded to a resin material or rubber material (see e.g., Patent Document 1). Compounding an ionic liquid to a resin material or rubber material can impart anti-static properties to a resin composition or rubber composition, but such an ionic liquid has a low compatibility with many of resin materials and rubber materials. Thus, the ionic liquid bleeds out on the surface of the resin composition or rubber composition to smear surrounding devices and the like, which is problematic.

RELATED ART

Patent Documents

Patent Document 1: Japanese Patent Laid-Open No. 2013-256499

SUMMARY OF THE INVENTION

Problem to be Solved by the Invention

The present invention has been made in the view of such situations, and it is an object thereof to provide an anti-static agent having excellent compatibility with a resin material and a rubber material as well as having excellent anti-static properties. It is another object of the present invention to provide a composition for a formed product and a cross-linkable composition prepared by using such an anti-static agent, a formed product and a cross-linked product obtained by using these, and further, a laminate obtained by using the above anti-static agent.

Means for Solving the Problem

The present inventors have been intensively studied in order to achieve the objects described above, and, as a result, have found that the above objects can be achieved by an anti-static agent containing a polyether compound having a cationic group, having completed the present invention.

That is, according to the present invention, provided is an anti-static agent containing a polyether compound having a cationic group.

According to the present invention, also provided is an anti-static agent prepared by cross-linking a composition for an anti-static agent, the composition containing a polyether compound having a cationic group and a cross-linking agent.

In the anti-static agent of the present invention, the polyether compound having a cationic group is preferably constituted by monomer unit represented by the following general formula (1):

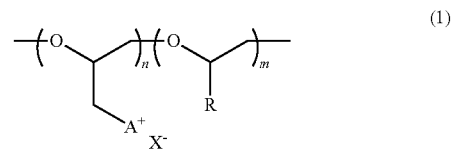

wherein $A^+$ represents a cationic group or cationic group-containing group, $X^-$ represents an arbitrary counter anion, R represents a non-ionic group, "n" is an integer of 2 or more, "m" is an integer of 0 or more, and "n+m" is an integer of 5 to 1000.

The present invention also provides a composition for a formed product that contains an anti-static agent containing a polyether compound having a cationic group and a resin and/or rubber, the content of the polyether compound having a cationic group being 0.1 to 30 parts by weight based on a total of 100 parts by weight of the resin and the rubber, and a formed product obtained by forming the composition for a formed product.

The present invention further provides a cross-linkable composition that contains an anti-static agent containing a polyether compound having a cationic group, a resin and/or rubber, and a cross-linking agent, the content of the polyether compound having a cationic group being 0.1 to 30 parts by weight based on a total of 100 parts by weight of the resin and the rubber, and a cross-linked product obtained by cross-linking the cross-linkable composition.

The present invention also provides a laminate including a layer of a formed product of a resin and/or rubber and a layer of an anti-static agent obtained by cross-linking a composition for an anti-static agent containing a polyether compound having a cationic group and a cross-linking agent.

Effects of Invention

According to the present invention, there can be provided an anti-static agent having excellent compatibility with a resin material and a rubber material as well as having excellent anti-static properties, a composition for a formed product and a cross-linkable composition prepared by using such an anti-static agent, additionally, a formed product and a cross-linked product obtained by using these, and a laminate obtained by using the above anti-static agent.

DESCRIPTION OF EMBODIMENTS

An anti-static agent of the present invention contains a polyether compound having a cationic group.

First, the polyether compound having a cationic group, which constituting the anti-static agent of the present invention, will be described.

<Polyether Compound Having a Cationic Group>

The polyether compound having a cationic group to be used in the present invention is a polyether compound that contains oxirane monomer unit as the main chain, which monomer unit is obtained by ring-opening polymerizing the oxirane structure moiety of a compound having an oxirane structure, the polyether compound having a cationic group in the molecule thereof.

Specific examples of oxirane monomer unit forming the polyether compound having a cationic group to be used in the present invention include, but are not limited to, alkylene oxide units such as an ethylene oxide unit, propylene oxide unit, and 1,2-butylene oxide unit; epihalohydrin units such as an epichlorohydrin unit, epibromohydrin unit, and epiiodohydrin unit; alkenyl group-containing oxirane monomer units such as an allyl glycidyl ether unit; aromatic ether group-containing oxirane monomer units such as a phenyl glycidyl ether unit; (meth)acryloyl group-containing oxirane monomer units such as a glycidyl acrylate unit and a glycidyl methacrylate unit and the like.

The polyether compound having a cationic group to be used in the present invention may have two or more types of oxirane monomer units. A distribution pattern of those repeating units is not particularly limited in this case, but the repeating units preferably have a random distribution.

Of the above monomer unit, epihalohydrin monomer unit, alkenyl group-containing oxirane monomer unit, and (meth) acryloyl group-oxirane monomer unit are oxirane monomer unit having a cross-linkable group. By such oxirane monomer unit having a cross-linkable group, a cross-linkable group can be introduced, in addition to a cationic group, into the polyether compound having a cationic group to be used in the present invention. In this case, by using a cross-linking agent in combination, the polyether compound having a cationic group can be cross-linked. In oxirane monomer unit constituting the polyether compound having a cationic group, a cationic group and a cross-linkable group may be contained in a single repeating unit or may be contained in separate repeating unit, and are preferably contained in separate repeating unit.

The proportion of the oxirane monomer unit having a cross-linkable group in the polyether compound having a cationic group used in the present invention is not particularly limited, and is preferably 50 mol % or less, more preferably 30 mol % or less, further preferably 15 mol % or less based on the entire oxirane monomer unit constituting the polyether compound having a cationic group. The lower limit of the proportion of the oxirane monomer unit having a cross-linkable group is not particularly limited. In order to make the polyether compound having a cationic group used in the present invention cross-linkable, the proportion is preferably 1 mol % or more.

The polyether compound having a cationic group used in the present invention contains oxirane monomer unit having a cationic group, as at least a portion of the oxirane monomer unit.

A cationic group that can be contained in the polyether compound having a cationic group used in the present invention is not particularly limited. In view of further enhancing the anti-static properties as an anti-static agent, the cationic group is preferably a cationic group in which an atom from the group 15 or 16 of the periodic table has formed an onium cation structure, more preferably a cationic group in which a nitrogen atom has formed an onium cation structure, further preferably a cationic group in which a nitrogen atom in a nitrogen atom-containing aromatic heterocycle has formed an onium cation structure, particularly preferably a cationic group in which a nitrogen atom in an imidazolium ring has formed an onium cation structure.

Specific examples of the cationic group include, but are not limited to, ammonium groups such as an ammonium group, methylammonium group, butylammonium group, cyclohexyl ammonium group, anilinium group, benzylammonium group, ethanolammonium group, dimethylammonium group, diethylammonium group, dibutylammonium group, nonylphenylammonium group, trimethylammonium group, triethylammonium group, n-butyldimethylammonium group, n-octyldimethylammonium group, n-stearyldimethylammonium group, tributylammonium group, trivinylammonium group, triethanolammonium group, N,N-dimethylethanolammonium group, and tri(2-ethoxyethyl) ammonium group; a group containing a heterocyclic ring having a cationic nitrogen atom such as a piperidinium group, 1-pyrrolidinium group, 1-methylpyrrolidinium group, imidazolium group, 1-methylimidazolium group, 1-ethylimidazolium group, benzimidazolium group, pyrrolium group, 1-methylpyrrolium group, oxazolium group, benzoxazolium group, benzisoxazolium group, pyrazolium group, isoxazolium group, pyridinium group, 2,6-dimethylpyridinium group, pyrazinium group, pyrimidinium group, pyridazinium group, triazinium group, N,N-dimethylanilinium group, quinolinium group, isoquinolinium group, indolinium group, isoindolium group, quinoxalium group, isoquinoxalium group, and thiazolium group; a group having a cationic phosphorus atom such as a triphenylphosphonium salt and a tributylphosphonium group, and the like. Among these, a group containing a heterocyclic ring having a cationic nitrogen atom, such as a 1-methylpyrrolidinium group, imidazolium group, 1-methylimidazolium group, 1-ethylimidazolium group, and benzimidazolium group, is preferable. In the polyether compound having a cationic group used in the present invention, all the cationic groups contained may be the same, or may be 2 or more different groups.

The cationic group usually has a counter anion. Examples of the counter anion can include, but are not particularly limited to, halide ions such as a fluoride ion, chloride ion, bromide ion, and iodide ion; a sulfate ion; a sulfite ion; a hydroxide ion; a carbonate ion; a hydrogencarbonate ion; a nitrate ion; an acetate ion; a perchlorate ion; a phosphate ion; an alkyloxy ion; a trifluoromethane sulfonate ion; a bistrifluoromethane sulfonimide ion; a hexafluorophosphate ion; a tetrafluoroborate ion, and the like. These counter anions may be appropriately selected depending on properties to be required as an anti-static agent. In the polyether compound having a cationic group used in the present invention, all the counter anions may be the same, or may be two or more different anions.

Among oxirane monomer unit constituting the polyether compound having a cationic group used in the present invention, at least a portion thereof may be oxirane monomer unit having a cationic group. For example, all the oxirane monomer unit constituting the polyether compound may have a cationic group, or both oxirane monomer unit having a cationic group and oxirane monomer unit having no cationic group may coexist. In the polyether compound having a cationic group used in the present invention, the proportion of the oxirane monomer unit having a cationic group is not particularly limited and is preferably 1 mol % or more, more preferably 10 mol % or more, particularly preferably 30 mol % or more based on the entire oxirane monomer units constituting the polyether compound having a cationic group. The upper limit of the proportion of the oxirane monomer unit having a cationic group is not particularly limited, but is preferably 99 mol % or less in order to make a composition containing the polyether compound having a cationic group used in the present invention cross-linkable. Setting the proportion of the oxirane monomer unit having a cationic group in the above range enables the anti-static properties of an anti-static agent to be more improved.

The structure of the polyether compound having a cationic group used in the present invention is not particularly limited, but a structure constituted by monomer unit represented by the following general formula (1) is preferable:

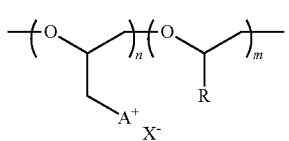

(1)

wherein $A^+$ represents a cationic group or cationic group-containing group, $X^-$ represents an arbitrary counter anion, R represents a non-ionic group, "n" is an integer of 2 or more, "m" is an integer of 0 or more, and "n+m" is an integer of 5 to 1000.

In the above general formula (1), $A^+$ represents a cationic group or a cationic group-containing group. Specific examples of the cationic group include those mentioned above, and specific examples of the cationic group-containing group include groups containing the cationic group mentioned above. All the cationic groups or cationic group-containing groups each represented by $A^+$ in the above general formula (1) may be the same, or may be two or more different groups.

In the above general formula (1), $X^-$ represents an arbitrary counter anion, and specific examples of the counter anion include those mentioned above. In the above general formula (1), all the counter anions represented by $X^-$ may be the same, or may be two or more different anions.

In the above general formula (1), R may be a non-ionic group, and is not particularly limited as long as being a non-ionic group. Examples of R include a hydrogen atom; alkyl groups having 1 to 10 carbon atoms such as a methyl group, ethyl group, n-propyl group, isopropyl group, n-butyl group, isobutyl group, and t-butyl group; alkenyl groups having 2 to 10 carbon atoms such as a vinyl group, allyl group, and propenyl group; alkynyl groups having 2 to 10 carbon atoms such as an ethynyl group and propynyl group; cycloalkyl groups having 3 to 20 carbon atoms such as a cyclopropyl group, cyclobutyl group, cyclopentyl group, and cyclohexyl group; and aryl groups having 6 to 20 carbon atoms such as phenyl group, 1-naphthyl group, and 2-naphthyl group, and the like.

Of these, alkyl groups having 1 to 10 carbon atoms, alkenyl groups having 2 to 10 carbon atoms, alkynyl groups having 2 to 10 carbon atoms, cycloalkyl groups having 3 to 20 carbon atoms, and aryl groups having 6 to 20 carbon atoms may have a substituent at an arbitrary position.

Examples of the substituent include alkyl groups having 1 to 6 carbon atoms such as a methyl group and ethyl group; alkoxy groups having 1 to 6 carbon atoms such as a methoxy group, ethoxy group, and isopropoxy group; alkenyloxy groups having 2 to 6 carbon atoms such as a vinyloxy group and allyloxy group; aryl groups which may have a substituent such as a phenyl group, 4-methylphenyl group, 2-chlorophenyl group, and 3-methoxyphenyl group; halogen atoms such as a fluorine atom, chlorine atom, and bromine atom; alkylcarbonyl groups having 1 to 6 carbon atoms such as a methylcarbonyl group and ethylcarbonyl group; and (meth)acryloyloxy groups such as an acryloyloxy group, and methacryloyloxy group, and the like. In the above general formula (1), when a plurality of non-ionic groups represented by R exists, all the groups may be the same, or may be two or more different groups.

In the above general formula (1), "n" may be an integer of 2 or more, and "m" may be an integer of 0 or more, but "n" is preferably an integer of 2 to 1000, more preferably an integer of 5 to 900, further preferably an integer of 5 to 700. "m" is preferably an integer of 0 to 998, more preferably an integer of 0 to 195, further preferably an integer of 0 to 95. Further, "n+m" is an integer of 5 to 1000, preferably an integer of 5 to 900, further preferably an integer of 10 to 700. Adjusting n, m, and n+m in the above general formula (1) appropriately enables the compatibility with a resin material and a rubber material and the anti-static properties to be appropriately adjusted. Particularly, setting n+m within the range described above enables the anti-static properties to be appropriately enhanced while bleeding-out in the case where the compound is compounded to a resin or rubber is appropriately suppressed.

When the structure of the polyether compound having a cationic group used in the present invention is constituted by the monomer unit represented by the general formula (1) described above, a polymer chain end is not particularly limited and may be any group. Examples of the polymer chain end group include the cationic groups mentioned above, a hydroxy group, a hydrogen atom, and the like.

The number average molecule weight (Mn) of the polyether compound having a cationic group used in the present invention is not particularly limited, but is preferably 500 to 500,000, more preferably 1,000 to 400,000, further preferably 2,000 to 300,000. The molecular weight distribution (Mw/Mn), which is the ratio of the weight average molecular weight (Mw) to the number average molecule weight (Mn) of the polyether compound having a cationic group used in the present invention, is preferably 1.0 to 3.0, more preferably 1.0 to 2.0. Particularly, setting the number average molecular weight (Mn) within the range described above enables the anti-static properties to be appropriately enhanced while bleeding-out in the case where the compound is compounded to a resin or rubber is appropriately suppressed. The number average molecular weight and the molecular weight distribution of the polyether compound having a cationic group can be determined by a method described in examples below. The molecular weight distribution of the polyether compound having a cationic group can be considered to be not changed from the molecular weight distribution of the base polymer before the cationic group is introduced (a polyether compound having no cationic group).

A method for synthesizing the polyether compound having a cationic group used in the present invention is not particularly limited, and any synthesis method can be employed as long as the method can provide an intended compound. An example of the synthesis method is shown as follows: first, a base polymer (polyether compound having no cationic group) is obtained by the following method (A) or (B):

(A) a method for obtaining a base polymer including ring-opening polymerizing an oxirane monomer-containing monomer that contains at least epihalohydrin, such as epichlorohydrin, epibromohydrin, and epiiodohydrin, in the presence of a catalyst that contains an onium salt of a compound containing an atom from the group 15 or 16 of the periodic table and trialkylaluminum in which alkyl groups contained are all straight-chained alkyl groups, which catalyst is disclosed in the Japanese Patent Laid-Open No. 2010-53217; or (B) a method for obtaining a base polymer including ring-opening polymerizing an oxirane monomer-containing monomer that contains at least epihalohydrin, such as epichlorohydrin, epibromohydrin, and epiiodohydrin, in the presence of a catalyst prepared by a reaction of triisobutylaluminum with phosphoric acid and triethylamine, which catalyst is disclosed in the Japanese Patent Publication No. 46-27534.

Then, the base polymer obtained by the method (A) or (B) described above is allowed to react with an amine compound such as an imidazole compound to convert a halogen group constituting the epihalohydrin monomer unit of the base polymer into an onium halide group. A halide ion constituting the onium halide group can be further subjected to an anion-exchange reaction, as required, to provide a polyether compound having a cationic group.

<Anti-Static Agent>

The anti-static agent of the present invention contains the polyether compound having a cationic group mentioned above. The anti-static agent of the present invention may be constituted only by the polyether compound having a cationic group described above (i.e., one containing the polyether compound having a cationic group of 100% by weight) or may contain components other than the polyether compound having a cationic group.

For example, the anti-static agent of the present invention may be an anti-static agent prepared by blending the polyether compound having a cationic group mentioned above with a cross-linking agent to provide a composition for an anti-static agent and cross-linking this composition.

The cross-linking agent may be appropriately selected depending on the type of cross-linkable group possessed by the polyether compound having a cationic group and the like. Specific examples of the cross-linking agent include sulfur such as powdery sulfur, precipitated sulfur, colloidal sulfur, insoluble sulfur, and highly dispersed sulfur; sulfur-containing compounds such as sulfur monochloride, sulfur dichloride, morpholine disulfide, alkyl phenol disulfide, dibenzothiazyl disulfide, N,N'-dithio-bis(hexahydro-2H-azepinon-2), phosphorus-containing polysulfide, and polymer polysulfides; organic peroxides such as dicumyl peroxide and di-t-butyl peroxide; quinone dioximes such as p-quinone dioxime and p,p'-dibenzoylquinone dioxime; organic polyvalent amine compounds such as triethylenetetramine, hexamethylene diamine carbamate, and 4,4'-methylene bis-o-chloroaniline; triazine compounds such as s-triazine-2,4,6-trithiol; alkyl phenol resins having a methylol group; various ultraviolet cross-linking agents including alkylphenone type photopolymerization initiators such as 2-methyl-1-(4-methylthiophenyl)-2-morpholinopropan-1-on and 2-(dimethylamino)-2-[(4-methylphenyl)methyl]-1-[4-(4-morpholinyl)phenyl]-1-butanone, and the like. For example, when the cross-linkable group possessed by the polyether compound having a cationic group is an ethylenic carbon-carbon unsaturated bonding-containing group, a cross-linking agent selected from sulfur, sulfur-containing compounds, organic peroxides, and ultraviolet cross-linking agents, among the cross-linking agents described above, is preferably used. Each of these cross-linking agents may be used singly or two or more of these may be used in combination. The amount of the cross-linking agent to be compounded in the composition for an anti-static agent of the present invention is not particularly limited, but is preferably 0.1 to 10 parts by weight, more preferably 0.2 to 7 parts by weight, further preferably 0.3 to 5 parts by weight with respect to 100 parts by weight of the polyether compound having a cationic group. Setting the amount of the cross-linking agent to be compounded within the range described above enables appropriate cross-linking while improving the anti-static effect.

The method for cross-linking the composition for an anti-static agent may be selected depending on type of cross-linking agent to be used and is not particularly limited. Examples of the method include cross-linking by heat and cross-linking by ultraviolet irradiation. The cross-linking temperature on cross-linking by heating is not particularly limited, but is preferably 130 to 200° C., more preferably 140 to 200° C. The cross-linking time is also not particularly limited, and selected in the range of 1 minute to 5 hours, for example. As the heating method, a method, such as press heating, oven heating, steam heating, hot air heating, microwave heating and the like, may be appropriately selected. In the case where cross-linking by ultraviolet irradiation is pertained, the composition for an anti-static agent may be irradiated with ultraviolet by using a light source, such as a high voltage mercury lamp, metal halide lamp, and mercury-xenon lamp, in accordance with a conventional method.

The anti-static agent of the present invention, which contains the polyether compound having a cationic group mentioned above, has excellent compatibility with a resin material and a rubber material as well as having excellent anti-static properties. Thus, the anti-static agent can be used in combination with various resins and rubbers and can appropriately impart excellent anti-static properties thereto.

<Composition for Formed Product>

The composition for a formed product of the present invention is a composition that contains the anti-static agent containing a polyether compound having a cationic group described above and a resin and/or rubber, the content of the polyether compound having a cationic group being 0.1 to 30 parts by weight based on a total of 100 parts by weight of the resin and the rubber.

The resin to be used in the present invention may be either of a thermosetting resin or thermoplastic resin and is not particularly limited. Examples of the thermosetting resin include an epoxy resin, melamine resin, Bakelite, urea resin, polyurethane, silicone resin and the like. Examples of the thermoplastic resin include polyolefin-based resins such as polyethylene, polypropylene, polycycloolefin, and 1,2-polybutadiene; vinyl-based resins such as polystyrene, acrylic resin, PAN, ABS resin, AS resin, vinyl chloride, and PVA; fluorine-based resins such as Teflon®; polyester-based resins such as PET and PBT; special resins such as polyamides including as nylon 66 and nylon 6, polyacetal, polycarbonate, polyimide, PEEK, polysulfone, polyether sulfone, and liquid crystal polymer, and the like. These resin are preferably nonionic. Each of these may be used singly or two or more of these may be used in combination.

The weight average molecular weight (Mw) of the thermoplastic resin used in the present invention is not particularly limited, but is preferably 20,000 to 1,000,000, more preferably 25,000 to 700,000, particularly preferably 30,000 to 500,000. In a case where a formed product is produced, setting the weight average molecular weight within the range described above enables the formed product to be obtained to have a sufficient strength while improving the forming processability.

The thermosetting resin used in the present invention may be a thermosetting resin that is cured by three-dimensional cross-linking or the like, and the molecular weight of the resin is not particularly limited.

The rubber used in the present invention is not particularly limited, and various rubbers, for example, diene-based rubbers such as butadiene rubber, styrene butadiene rubber, chloroprene rubber, isoprene rubber, natural rubber, acrylonitrile butadiene rubber (nitrile rubber), butyl rubber, and partially hydrogenated products of those rubbers (for example, a hydrogenated nitrile rubber); and rubbers other than the diene-based rubber, such as ethylene propylene rubber, acrylic rubber, polyether rubber, polyurethane rubber, fluoro rubber, and silicone rubber, and the like may be employed without limitation. These rubbers are preferably nonionic. Each of these may be used singly or two or more of these may be used in combination. Further, these rubbers may be used in combination with the resins mentioned above.

The resin and/or rubber used in the present invention is preferably a polyethylene terephthalate (PET) resin, acrylic resin, polypropylene resin, styrene butadiene rubber, or fluorine rubber. Use of a resin and/or rubber of the types described above enables the compatibility with the polyether compound having a cationic group to be improved.

The weight average molecular weight (Mw) of the rubber used in the present invention is not particularly limited, but is preferably 100,000 to 2,000,000, more preferably 200,000 to 2,000,000, particularly preferably 400,000 to 1,500,000. In a case where a formed product is produced, Setting the weight average molecular weight within the range described above enables the formed product to be obtained to have a sufficient strength while improving the forming processability.

The measurement of the weight average molecular weight (Mw) of the resin and rubber used in the present invention can be determined by gel permeation chromatography as a molecular weight in terms of polystyrene.

The Mooney viscosity (ML1+4, 100° C.) of the rubber used in the present invention is preferably 5 to 250, more preferably 10 to 200, particularly preferably 20 to 160.

The content of the polyether compound having a cationic group in the composition for a formed product of the present invention is 0.1 to 30 parts by weight, preferably 0.2 to 25 parts by weight, more preferably 0.5 to 25 parts by weight, further preferably 3 to 25 parts by weight based on a total of 100 parts by weight of the resin and the rubber. If the content of the polyether compound having a cationic group is extremely low, it is difficult to exhibit an effect of the polyether compound having a cationic group compounded, that is, an anti-static effect. In contrast, if the content of the polyether compound having a cationic group is extremely high, a formed product to be obtained may have degraded mechanical properties.

The composition for a formed product of the present invention may further contain a filler. The filler is not particularly limited, and examples thereof include carbon materials such as activated carbon, carbon black, carbon nanotubes, graphite, and graphene; metal powders such as aluminum powder, gold powder, silver powder, copper powder, nickel powder, indium powder, gallium powder, and metal silicon powder; metal oxide powders such as zinc oxide powder, silica powder, titanium oxide powder, alumina powder, silver oxide powder, zirconium oxide powder, and magnesium oxide powder; metal nitride powders such as boron nitride powder and aluminum nitride powder, and the like. Each of these fillers may be used singly or two or more of these may be used in combination. The amount of the filler to be compounded in the composition for a formed product of the present invention is not particularly limited, but is preferably 0.01 to 30 parts by weight, more preferably 0.1 to 20 parts by weight, further preferably 1 to 20 parts by weight based on a total of 100 parts by weight of the resin and the rubber. Setting the amount of the filler to be compounded within the range described above provides an appropriate reinforcing effect of the filler compounded while improving anti-static properties.

Further, the composition for a formed product of the present invention may contain other additives usually compounded in a resin or rubber. Such additives are not particularly limited, and examples thereof include an acid acceptor; reinforcing agent; anti-aging agent; plasticizer; ultraviolet absorber; light-resistant stabilizer; tackifier; surfactant; electric conductivity imparting agent; electrolyte material; colorant (dye, pigment); flame retardant, and the like.

The composition for a formed product of the present invention can be prepared by blending and kneading components constituting an anti-static agent containing a polyether compound having a cationic group, and a filler and other additives, which are used as required, into a resin and/or rubber by a desired method. On blending and kneading, one of any kneading-forming machines such as a kneader, a Banbury, open roll, calendar roller, and twin screw extruder may be used singly or a plurality of these may be used in combination to perform kneading and forming.

<Formed Product>

The formed product of the present invention can be obtained by forming the composition for a formed product of the present invention mentioned above. A forming method is not particularly limited and may be selected depending on the shape, size, and the like of a formed product to be obtained. Examples of the method include a method in which a formed product is obtained by extruding a composition for a formed product by using a single-screw or multi-screw extruder, a method in which a composition is formed in a mold by using an injection molding machine, extrusion blow forming machine, transfer forming machine, or press forming machine, and the like.

The formed product of the present invention obtained as described above contains the anti-static agent containing a polyether compound having a cationic group mentioned above in a specific content. Thus, the surface resistance value of the formed product, which is a value measured 30 seconds after voltage application is started with an applied voltage of 1000 V in a measurement environment of a temperature of 23° C. and a humidity of 50%, can be preferably $1\times10^3$ to $1\times10^{12}$ Ω·cm (Ohm-cm), more preferably $1\times10^3$ to $1\times10^{11}$ Ω·cm (Ohm-cm), further preferably $1\times10^3$ to $1\times10^{10}$ Ω·cm (Ohm-cm). Accordingly, the formed product has excellent anti-static properties. Particularly, the anti-static agent containing a polyether compound having a cationic group used in the present invention exhibits a high affinity to various resins and/or rubbers, and thus, has a property of not bleeding out. In addition to this, in the formed product of the present invention, the anti-static agent has a specific property of existing at a higher content at the surface of the formed product than at the inside thereof (i.e., has a property of being likely to migrate to the surface of the formed product). Thus, the anti-static agent can allow the surface resistance value to be in the range described above while making the original properties of the resin and/or rubber sufficient, thereby enabling a high anti-static effect to be achieved.

<Cross-Linkable Composition>

The cross-linkable composition of the present invention is a cross-linkable composition that contains the anti-static agent containing a polyether compound having a cationic group described above, a resin and/or rubber, and a cross-linking agent, the content of the polyether compound having a cationic group being 0.1 to 30 parts by weight based on a total of 100 parts by weight of the resin and the rubber.

The resin may be either of a thermosetting resin or a thermoplastic resin and is not particularly limited. For example, a resin mentioned above for the composition for a formed product mentioned above can be used.

The rubber is also not particularly limited, and a rubber mentioned above for the composition for a formed product can be used, for example.

The content of the polyether compound having a cationic group in the cross-linkable composition of the present invention is 0.1 to 30 parts by weight, preferably 0.2 to 25 parts by weight, more preferably 0.5 to 15 parts by weight, further preferably 3 to 10 parts by weight based on a total of 100 parts by weight of the resin and the rubber. If the content of the polyether compound having a cationic group is extremely low, it is difficult to exhibit an effect of the polyether compound having a cationic group compounded, that is, an anti-static effect. In contrast, if the content of the polyether compound having a cationic group is extremely high, a cross-linked product to be obtained may have degraded mechanical properties.

The cross-linking agent may be a compound that can crosslink a resin and/or rubber and may be appropriately selected depending on the type of cross-linkable group possessed by a resin and/or rubber to be used, and the like. For example, various cross-linking agents mentioned above can be used. The amount of the cross-linking agent to be compounded in the cross-linkable composition of the present invention is not particularly limited, but is preferably 0.1 to 10 parts by weight, more preferably 0.2 to 7 parts by weight, further preferably 0.3 to 5 parts by weight based on a total of 100 parts by weight of the resin and the rubber. Setting the amount of the cross-linking agent to be compounded within the range described above enables appropriate cross-linking while improving the anti-static effect.

When a cross-linking agent is used, a cross-linking acceleration aid and a cross-linking accelerator are preferably used together of the cross-linking agent. The cross-linking acceleration aid is not particularly limited, and examples thereof include zinc oxide, stearic acid and the like. The cross-linking accelerator is not particularly limited, and, for example, a guanidine-based compound; aldehyde-amine-based compound; aldehyde-ammonia-based compound; thiazole-based compound; sulfenamide-based compound; thiourea-based compound; thiuram-based compound; dithiocarbamate-based compound; polyvinyl compound, or the like can be used. The cross-linking aid and the cross-linking accelerator each may be used singly, or two or more of these may be used in combination. The amount each of the cross-linking acceleration aid and the cross-linking accelerator to be used is not particularly limited, but is preferably 0.01 to 15 parts by weight, more preferably 0.1 to 10 parts by weight based on a total of 100 parts by weight of the resin and the rubber.

The cross-linkable composition of the present invention may further contain a filler. The filler is not particularly limited, but a filler mentioned above for the composition for a formed product can be used, for example, in a similar amount mentioned above.

Further, the cross-linkable composition of the present invention may contain other additives usually compounded in a resin or rubber. Such additives are not particularly limited, but additives mentioned above for the composition for a formed product can be used, for example.

The cross-linkable composition of the present invention can be prepared by blending and kneading components constituting an anti-static agent containing a polyether compound having a cationic group, a cross-linking agent, and a filler and other additives, which are used as required, into a resin and/or rubber by a desired method. On blending and kneading, one of any kneading-forming machines such as a kneader, Banbury, open roll, calendar roller, and twin screw extruder may be used singly or a plurality of these may be used in combination to perform kneading and forming.

<Cross-Linked Product>

The cross-linked product of the present invention can be obtained by cross-linking the cross-linkable composition of the present invention mentioned above. The cross-linking method is not particularly limited and may be selected depending on the shape, size, and the like of a cross-linked product to be obtained. Examples of the method include a method in which a cross-linkable composition is extruded by using a single-screw or multi-screw extruder to provide a formed product, and then the formed product is cross-linked by heating; and a method in which the composition is formed in a mold by using an injection forming machine, extrusion blow forming machine, transfer forming machine, press forming machine, or the like while cross-linked by the heating during forming and the like. The heating temperature and heating time are the same as in the method for cross-linking a composition for an anti-static agent mentioned above.

The cross-linked product of the present invention obtained as described above contains the anti-static agent containing a polyether compound having a cationic group mentioned above in a specific content. Thus, the surface resistance value of the cross-linked product, which is a value measured 30 seconds after voltage application is started with an applied voltage of 1000 V in a measurement environment of a temperature of 23° C. and a humidity of 50%, can be preferably $1\times10^3$ to $1\times10^{12}$ Ω·cm (Ohm-cm), more preferably $1\times10^3$ to $1\times10^{11}$ Ω·cm (Ohm-cm), further preferably $1\times10^3$ to $1\times10^{10}$ Ω·cm (Ohm-cm). Accordingly, the cross-linked product has excellent anti-static properties. Particularly, the anti-static agent containing a polyether compound having a cationic group used in the present invention exhibits a high affinity to a wide variety of resins and/or rubbers, and thus, has a property of not bleeding out. In addition to this, in the cross-linked product of the present invention, the anti-static agent has a specific property of existing at a higher content at the surface of the cross-linked product than at the inside thereof (i.e., has a property of being likely to migrate to the surface of the cross-linked product). Thus, the anti-static agent can allow its surface resistance value to be in the range described above while making the original properties of the resin and/or rubber sufficient, thereby enabling a high anti-static effect to be achieved.

<Laminate>

The laminate of the present invention includes a layer of a formed product of a resin and/or rubber and a layer of an anti-static agent obtained by cross-linking a composition for an anti-static agent containing a polyether compound having a cationic group and a cross-linking agent.

The formed product of a resin and/or rubber is not particularly limited, and there can be used a formed product, without limitation, prepared by using the resin and/or rubber exemplified for the composition for a formed product mentioned above by a known forming method. The formed product of a resin and/or rubber may contain the filler, the cross-linking agent, and other compounding agents exemplified for the composition for a formed product mentioned above. When a cross-linking agent is contained, the formed product may have been cross-linked as required.

The laminate of the present invention can be produced by, for example, coating a surface of a layer of a formed product of a resin and/or rubber with a composition for an anti-static agent by a solution cast method and then cross-linking the composition for an anti-static agent to form layer of an anti-static agent. Alternatively, the laminate may be produced by forming a layer of an anti-static agent in advance, and then, layering a layer of a formed product of a resin and/or rubber on this layer. Further, the laminate may be produced by performing formation of a layer of a composition for an anti-static agent and a layer of a formed product of a resin and/or rubber by coextrusion or the like simultaneously with layering of these layers, and then, cross-linking the layer of the composition for an anti-static agent to thereby form a layer of an anti-static agent.

In the laminate of the present invention, the thickness of the layer of an anti-static agent is not particularly limited, but is preferably 0.01 to 100 µm, more preferably 0.05 to 50 µm in view of providing a more sufficient anti-static effect.

In the laminate of the present invention, the thickness of the layer of a formed product of a resin and/or rubber is not particularly limited, but is usually 10 to 1000 µm.

In the laminate of the present invention, a layer of a formed product of a resin and/or rubber and a layer of an anti-static agent obtained by cross-linking a composition for an anti-static agent containing a polyether compound having a cationic group and a cross-linking agent are preferably layered.

The laminate of the present invention to be obtained as described above includes a layer of an anti-static agent obtained by cross-linking a composition for an anti-static agent containing the polyether compound having a cationic group mentioned above and a cross-linking agent. The surface resistance value thereof (the surface resistance value of the surface on which the layer of an anti-static agent is formed), which is a value measured 30 seconds after voltage application is started with an applied voltage of 1000 V in a measurement environment of a temperature of 23° C. and a humidity of 50%, can be preferably $1\times10^3$ to $1\times10^{12}$ Ω·cm (Ohm-cm), more preferably $1\times10^3$ to $1\times10^{11}$ Ω·cm (Ohm-cm), further preferably $1\times10^3$ to $1\times10^{10}$ Ω·cm (Ohm-cm). Accordingly, the laminate has excellent anti-static properties. Particularly, the anti-static agent containing a polyether compound having a cationic group used in the present invention exhibits a high affinity to a wide variety of resins and/or rubbers, and thus, can improve the adhesion between a layer of a formed product of a resin and/or rubber and a layer of the anti-static agent. Thus, the laminate of the present invention can provide sufficient reliability while sufficiently maintaining the original properties of the resin and/or rubber. Furthermore, because of the surface resistance value in the range described above, the laminate of the present invention can exhibit a high anti-static effect.

<Conductive Member>

The formed product, cross-linked product, and laminate of the present invention, which each have a surface resistance value in the range mentioned above, can be suitably used as, for example, an electrically conductive member such as a conductive roll, conductive blade, and conductive belt for use in a copier or printer; a material for shoe soles and hoses; a material for belts such as conveyor belts and escalator hand-rails; an anti-static container, anti-static sheet, anti-static film, anti-static seal, or anti-static bag in a semiconductor and electronic device production step; a material for seals or packings; and the like, by taking advantage of their properties.

EXAMPLES

Hereinafter, the present invention will be explained based on more detailed examples, but the present invention is not limited to these examples. Note that, in the examples, "parts" are based on weight unless otherwise indicated. Tests and evaluations conformed to the following.

(1) Number Average Molecular Weight (Mn) and Molecular Weight Distribution (Mw/Mn)

The number average molecular weight (Mn) and molecular weight distribution (Mw/Mn) of a base polymer (polyether compound having no cationic group) were measured, in terms of polystyrene by gel permeation chromatography (GPC) with tetrahydrofuran as a solvent. As a measuring instrument, an HLC-8320 (manufactured by TOSOH CORPORATION) was used. As a column, four TSK gel Super Multipore HZ-H's (manufactured by TOSOH CORPORATION) connected in series were used. As a detector, a differential refractometer RI-8320 (manufactured by TOSOH CORPORATION) was used.

The number average molecular weight (Mn) of a polyether compound having a cationic group was determined as follows. Specifically, first, an average molecular weight of all repeating units constituting a polyether compound having a cationic group was determined from an average molecular weight of the repeating units of the base polymer (polyether compound having no cationic group), an average weight of oxirane monomer unit having a cationic group, and a content of the oxirane monomer unit having a cationic group determined by the following (2). Then, the number of the repeating units of the base polymer (polyether compound having no cationic group) was multiplied by the average molecular weight of all the repeating units constituting the polyether compound having a cationic group, and the resultant value was taken as the number average molecular weight of the polyether compound having a cationic group.

(2) Structure of Polyether Compound Having Cationic Group and Content of Oxirane Monomer Unit Having Cationic Group A structure of a polyether compound having a cationic group and a content of oxirane monomer unit having a cationic group in the polyether compound having a cationic group were determined as follows using a nuclear magnetic resonator (MNR). That is, first, 30 mg of a polyether compound having a cationic group, as a sample, was added to 1.0 mL of deuterated chloroform or deuterated dimethyl sulfoxide, and the resultant mixture was shaken for 1 hour so that the sample was dissolved uniformly. The resultant solution was then subjected to an NMR measurement to obtain a $^1$H-NMR spectrum, and the structure of the polyether compound was determined in accordance with a usual method.

The content of the oxirane monomer unit having a cationic group in the polyether compound having a cationic group was calculated by the following method. That is, first, the number of moles B1 of all the oxirane monomer units was calculated from an integrated value of protons derived from the oxirane monomer units in the main chain. Next, the number of moles B2 of the oxirane monomer units having a cationic group was calculated from an integrated value of protons derived from the cationic group. Then, the ratio of B2 to B1 (percentage) was determined as the content of the oxirane monomer units having a cationic group in the polyether compound having a cationic group.

(3) Surface Resistance Value (23° C., 50% RH)

The resultant film-type formed product, film-type laminate, or sheet-type cross-linked product was used to determine a surface resistance value. On measuring the surface resistance value, a Hiresta-UXMCP-HT800 (manufactured by Mitsubishi Chemical Analytech Co., Ltd.) was used to determine a value 30 seconds after voltage application was started with an applied voltage of 1000 V under measurement conditions of a temperature of 23° C. and a humidity of 50%. When the surface resistance value is smaller, it can be determined that the electrical conductivity is higher and that the anti-static properties are more excellent.

Production Example 1

(Synthesis of Polyether Compound a by Living Anion Polymerization of Epichlorohydrin)

To a glass reactor equipped with a stirrer and purged with argon, 3.22 g of tetra-normal butylammonium bromide and 100 ml of toluene were added, and the mixture was cooled to 0° C. Next, 1.370 g of triethylaluminum (1.2 equivalents with respect to tetra-normal butylammonium bromide) dissolved in 10 ml of normal hexane was added thereto, and the mixture was allowed to react for 15 minutes to obtain a catalyst composition. To the resultant catalyst composition, 35.0 g of epichlorohydrin was added, and the mixture was subjected to polymerization reaction at 0° C. After the polymerization reaction was started, the viscosity of the solution gradually rose. After 12 hours of the reaction, a small amount of water was poured into the polymerization reaction solution to stop the reaction. The resultant polymerization reaction solution was washed with a 0.1 N hydrochloric acid aqueous solution to subject the catalyst residue to deashing treatment. The residue was further washed with ion exchanged water. Then, the organic phase was dried in vacuo at 50° C. for 12 hours to obtain an oily material in a yield of 34.6 g. The resultant oily material had a number average molecular weight (Mn) of 3,500 and a molecular weight distribution (Mw/Mn) of 1.4, according to GPC measurement. Additionally, when the resultant oily material was subjected to $^1$H-NMR measurement, the number of repeating units (number of oxirane monomer units) was 37. From the foregoing, the resultant oily material was identified as a polyether compound A having a bromomethyl group at the polymerization initiating end, which was constituted by epichlorohydrin units (number of repeating units: 37).

Production Example 2

(Quaternization of Epichlorohydrin Units in Polyether Compound a by 1-methylimidazole)

To a glass reactor equipped with a stirrer and purged with argon, 5.0 g of the polyether compound A obtained in Production Example 1, 12.1 g of 1-methylimidazole, and 10.0 g of acetonitrile were added, and the mixture was heated to 80° C. After reaction at 80° C. for 48 hours, the mixture was cooled to room temperature to stop the reaction. After the resultant reaction product was washed with a mixture solution of toluene/methanol/water of an equal weight, the organic phase containing 1-methylimidazole and toluene was removed. The aqueous phase was dried under reduced pressure at 50° C. for 12 hours to obtain a pale red solid in a yield of 9.4 g. This solid was subjected to $^1$H-NMR measurement and elementary analysis to be identified as an imidazolium structure-containing polyether compound B having a halide ion as a counter anion, in which all the chloro groups in the repeating units of the polyether compound A as a starting material were each substituted by a 1-methylimidazolium chloride group, and the bromo group in the bromomethyl group at the polymerization initiating end of the compound A was substituted by a 1-methylimidazolium bromide group. The imidazolium structure-containing polyether compound B had a number average molecular weight (Mn) of 6,500.

Production Example 3

(Anion Exchange of Imidazolium Structure-Containing Polyether Compound B by Lithium bis(trifluoromethanesulfonyl)imide)

To a glass reactor equipped with a stirrer, 2.5 g of imidazolium structure-containing polyether compound B obtained in Production Example 2, 4.1 g of lithium bis(trifluoromethanesulfonyl)imide, and 20 mL of ion exchange water were added. After reaction at room temperature for 30 minutes, the mixture was dried under reduced pressure at 50° C. for 12 hours. After the resultant solid-liquid mixture was washed with water to remove inorganic salt, the liquid phase was extracted with toluene. The resultant toluene solution was dried under reduced pressure at 50° C. for 12 hours to obtain a viscous liquid material in a yield of 5.7 g. The resultant viscous liquid material was subjected to $^1$H-NMR measurement and elementary analysis to be identified as an imidazolium structure-containing polyether compound C having a bis(trifluoromethanesulfonyl)imide anion as a counter anion, in which all the chloride ions and bromide ion in the imidazolium structure-containing polyether compound B having a halide ion as a counter anion, as a starting material, were each substituted by a bis(trifluoromethanesulfonyl)imide anion. The resultant imidazolium structure-containing polyether compound C had a number average molecular weight (Mn) of 15,500.

Production Example 4

(Synthesis of Polyether Compound D by Living Anion Copolymerization of Epichlorohydrin and Glycidyl Methacrylate)

To a glass reactor equipped with a stirrer and purged with argon, 0.032 g of tetra-normal butylammonium bromide and 5 ml of toluene were added, and the mixture was cooled to 0° C. Next, 0.029 g of triethylaluminum (2.5 equivalents with respect to tetra-normal butylammonium bromide) dissolved in 0.25 ml of normal hexane was added thereto, and the mixture was allowed to react for 15 minutes to obtain a catalyst composition. To the resultant catalyst composition, 9.5 g of epichlorohydrin and 0.5 g of glycidyl methacrylate were added, and the mixture was subjected to polymerization reaction at 0° C. After the polymerization reaction was started, the viscosity of the solution gradually rose. After 1 hours of the reaction, a small amount of 2-propanol was poured into the polymerization reaction solution to stop the reaction. Subsequently, the resultant polymerization reaction solution was diluted with toluene and then poured into 2-propanol to obtain a white rubbery material in a yield of 8.3 g. The resultant rubbery material had a number average molecular weight (Mn) of 57,000 and a molecular weight distribution of 1.58, according to GPC measurement. When the resultant rubbery material was further subjected to ¹H-NMR measurement, this rubbery material was confirmed to contain 97.0 mol % epichlorohydrin units and 3.0 mol % glycidyl methacrylate units. From the foregoing, it can be said that the resultant rubbery material is a polyether compound D having a bromomethyl group at the polymerization initiating end, which was constituted by epichlorohydrin units and glycidyl methacrylate units (606-mer constituted by 588 epichlorohydrin units and 18 glycidyl methacrylate units on average).

Production Example 5

(Quaternization of Epichlorohydrin Units in Polyether Compound D by 1-methylimidazole)

To a glass reactor equipped with a stirrer and purged with argon, 8.0 g of the polyether compound D obtained in Production Example 4, 22.0 g of 1-methylimidazole, and 16.0 g of N, N-dimethylformamide were added, and the mixture was heated to 80° C. After reaction at 80° C. for 144 hours, the mixture was cooled to room temperature to stop the reaction. A portion of the resultant reaction solution was extracted and dried under reduced pressure at 50° C. for 120 hours to obtain a reddish brown resinous material in a yield of 15.0 g. This resinous material was subjected to ¹H-NMR measurement and elementary analysis to be identified as an imidazolium structure-containing polyether compound E having a halide ion as a counter anion, in which the chloro groups in all the epichlorohydrin units of the polyether compound D as a starting material were each substituted by a 1-methylimidazolium chloride group and the bromo group in the bromomethyl group at all the polymerization initiating ends of the compound D was substituted by 1-methylimidazolium bromide group. The resultant polyether compound E had a number average molecular weight (Mn) of 108,000.

Production Example 6

(Anion Exchange of Imidazolium Structure-Containing Polyether Compound E by lithium bis(trifluoromethanesulfonyl)imide)

To a glass reactor equipped with a stirrer, 300 ml of distilled water containing 26.0 g of lithium bis(trifluoromethanesulfonyl)imide dissolved therein was added. Separately from this, 5.0 g of the imidazolium structure-containing polyether compound E obtained in Production Example 5 was dissolved in 50 ml of distilled water. This solution was added dropwise to the glass reactor described above and allowed to react at room temperature for 30 minutes. After the reaction, the precipitated rubbery material was collected and dissolved in acetone. Then, the acetone solution was added dropwise in 300 ml of distilled water to remove inorganic salt by polymer coagulation. Then, the rubbery material obtained by coagulation was dried under reduced pressure at 50° C. for 12 hours to obtain a pale brown rubbery material in a yield of 11.5 g. The resultant rubbery material was subjected to ¹H-NMR measurement and elementary analysis to be identified as an imidazolium structure-containing polyether compound F having a bis(trifluoromethanesulfonyl)imide anion as a counter anion, in which all the chloride ions and bromide ions of the polyether compound E as a starting material were each substituted by a bis(trifluoromethanesulfonyl)imide anion. The resultant imidazolium structure-containing polyether compound F had a number average molecular weight (Mn) of 259,000.

Example 1

To 100 parts of a polyethylene terephthalate resin (product name "KURAPET KS710", manufactured by KURA-RAY CO., LTD, Mw=169,000), 5 parts of the resultant imidazolium structure-containing polyether compound B obtained in Production Example 2 was compounded and premixed. Then, the mixture was dried at room temperature for 12 hours and then kneaded by a twin-screw kneader (product name "TEX-30", manufactured by The Japan Steel Works, LTD.) to obtain pellets of a composition for a formed product, containing the polyethylene terephthalate resin and the imidazolium structure-containing polyether compound B. The resultant pellets were dried under reduced pressure and then press-formed by a vacuum press machine to obtain a film-type formed product having a thickness of 250 µm. Then, the resultant film-type formed product was used for measuring a surface resistance value in accordance with the method described above. The results are shown in Table 1.

Example 2

A composition for a formed product containing a polyethylene terephthalate resin and the imidazolium structure-containing polyether compound C and a film-type formed product having a thickness of 250 µm were obtained in the same manner as in Example 1 except that 5 parts of the imidazolium structure-containing polyether compound B was replaced by 5 parts of the imidazolium structure-containing polyether compound C obtained in Production Example 3. Then, the resultant film-type formed product was used for measuring a surface resistance value in accordance with the method described above. The results are shown in Table 1.

Example 3

A composition for a formed product containing a polyethylene terephthalate resin and the imidazolium structure-containing polyether compound E and a film-type formed product having a thickness of 250 µm were obtained in the same manner as in Example 1 except that 5 parts of the imidazolium structure-containing polyether compound B was replaced by 20 parts of the imidazolium structure-containing polyether compound E obtained in Production Example 5. Then, the resultant film-type formed product was used for measuring a surface resistance value in accordance with the method described above. The results are shown in Table 1.

Example 4

A composition for a formed product containing a polyethylene terephthalate resin and the imidazolium structure-containing polyether compound F and a film-type formed product having a thickness of 250 µm were obtained in the same manner as in Example 1 except that 5 parts of the imidazolium structure-containing polyether compound B was replaced by 20 parts of the imidazolium structure-containing polyether compound F obtained in Production Example 6. Then, the resultant film-type formed product was used for measuring a surface resistance value in accordance with the method described above. The results are shown in Table 1.

Example 5

By a vacuum press machine, 100 parts of a polyethylene terephthalate resin (product name "KURAPET KS710", manufactured by KURARAY CO., LTD, Mw=169,000) were heat press-formed to obtain a polyethylene terephthalate film having a thickness of 250 μm. Next, one surface of the resultant polyethylene terephthalate film was coated with a composition for an anti-static agent containing 5 parts of the resultant imidazolium structure-containing polyether compound F obtained Production Example 6 and 0.1 parts of 2-(dimethylamino)-2-[(4-methylphenyl)methyl]-1-[4-(4-morpholinyl)phenyl]-1-butanone (product name "Irgacure® 379EG" manufactured by BASF SE) as a cross-linking agent, so as to achieve a thickness of 12 μm. Subsequently, the composition for an anti-static agent was cross-linked by performing UV irradiation to thereby obtain a film-type laminate including a layer of the formed product of polyethylene terephthalate and a layer of the anti-static agent. Then, the resultant film-type laminate was used for measuring a surface resistance value (resistance value of the surface on which the layer of the anti-static agent was formed) in accordance with the method described above. The results are shown in Table 1.

Example 6

To 100 parts of an acrylic resin (product name "ACRYPET MD", manufactured by MITSUBISHI RAYON CO., LTD., Mw=60,000), 5 parts of the imidazolium structure-containing polyether compound B obtained in Production Example 2 was compounded and premixed. Then, the mixture was dried at room temperature for 12 hours and then kneaded by a twin-screw kneader (product name "TEX-30", manufactured by The Japan Steel Works, LTD.) to obtain pellets of a composition for a formed product, containing the acrylic resin and the imidazolium structure-containing polyether compound B. The resultant pellets were dried under reduced pressure and then press-formed by a vacuum press machine to obtain a film-type formed product having a thickness of 250 μm. Then, the resultant film-type formed product was used for measuring a surface resistance value in accordance with the method described above. The results are shown in Table 1.

Example 7

A composition for a formed product containing an acrylic resin and the imidazolium structure-containing polyether compound F and a film-type formed product having a thickness of 250 μm were obtained in the same manner as in Example 6 except that 5 parts of the imidazolium structure-containing polyether compound B was replaced by 5 parts of the imidazolium structure-containing polyether compound F obtained in Production Example 6. Then, the resultant film-type formed product was used for measuring a surface resistance value in accordance with the method described above. The results are shown in Table 1.

Example 8

By a vacuum press machine, 100 parts of a polypropylene resin (product name "NOVATEC PPMA3", manufactured by Japan Polypropylene Corporation, Mw=390,000) were heat press-formed to obtain a polypropylene film having a thickness of 300 μm. Next, one surface of the resultant polypropylene film was coated with a composition for an anti-static agent containing 5 parts of the resultant imidazolium structure-containing polyether compound F obtained Production Example 6 and 0.1 parts of 2-(dimethylamino)-2-[(4-methylphenyl)methyl]-1-[4-(4-morpholinyl)phenyl]-1-butanone (product name "Irgcure® 379EG", manufactured by BASF SE) as a cross-linking agent, so as to achieve a thickness of 15 μm. Subsequently, the composition for an anti-static agent was cross-linked by performing UV irradiation to thereby obtain a film-type laminate including a layer of the formed product of polypropylene and a layer of the anti-static agent. Then, the resultant film-type laminate was used for measuring a surface resistance value (resistance value of the surface on which the layer of the anti-static agent was formed) in accordance with the method described above. The results are shown in Table 1.

Example 9

Into an open roll at 40° C., 100 parts of a styrene butadiene rubber (product name "Nipol NS116R", manufactured by Zeon Corporation, Mooney viscosity [ML1+4 (100° C.)]=45), 5 parts of the resultant imidazolium structure-containing polyether compound F obtained in Production Example 6, 10 parts of carbon black (product name "Seast SO", manufactured by TOKAI CARBON CO., LTD.) as a filler, 1 part of stearic acid as a cross-linking acceleration aid, 1 part of tetraethylthiuram disulfide (product name "NOCCELER TET", manufactured by OUCHI SHINKO CHEMICAL INDUSTRIAL CO., LTD.) as a cross-linking accelerator, and 0.5 parts of sulfur (product name "SULFAX PMC", manufactured by Tsurumi Chemical Industry Co., Ltd.) as a cross-linking agent were loaded. These components were kneaded for 10 minutes to obtain a cross-linkable composition containing the styrene butadiene rubber, the imidazolium structure-containing polyether compound F, the cross-linking agent, and the various compounding agents. The resultant cross-linkable composition was press cross-linked at 170° C. for 20 minutes to obtain a sheet-type cross-linked product having a thickness of 250 μm. Then, the resultant sheet-type cross-linked product was used for measuring a surface resistance value in accordance with the method described above. The results are shown in Table 1.

Example 10

Into an open roll at 40° C., 100 parts of a fluorine rubber (product name "DAI-EL 952", manufactured by Daikin Industries, Ltd., VdF/HEP copolymer, VdF/HEP=78/22 (molar ratio), Mw=800,000), 5 parts of the resultant imidazolium structure-containing polyether compound F obtained in Production Example 6, 20 parts of carbon black (product name "Seast SO", manufactured by TOKAI CARBON CO., LTD.) as a filler, 4 parts of triallyl isocyanurate (product name "TMAIC", manufactured by The Nippon Synthetic Chemical Industry Co., Ltd.) as a cross-linking accelerator, and 1.5 parts of a peroxide (product name "PERHEXA 25B", manufactured by NOF CORPORATION) were loaded. These components were kneaded for 10 minutes to obtain a cross-linkable composition containing the fluorine rubber, the imidazolium structure-containing polyether compound F, the cross-linking agent, and the various compounding agents. The resultant cross-linkable composition was press cross-linked at 160° C. for 10 minutes to obtain a sheet-type cross-linked product having a thickness of 250 μm. Then, the resultant sheet type cross-linked product was used for measuring a surface resistance value in accordance with the method described above. The results are shown in Table 1.

Comparative Example 1

In a vacuum press, 100 parts of the polyethylene terephthalate resin used in Example 1, as it was, without the imidazolium structure-containing polyether compound B compounded, was press-formed to obtain a film-type formed product of the polyethylene terephthalate resin having a thickness of 250 μm. Then, the resultant film-type formed product was used for measuring a surface resistance value in accordance with the method described above. The results are shown in Table 2.

Comparative Example 2

In a vacuum press, 100 parts of the acrylic resin used in Example 6, as it was, without the imidazolium structure-containing polyether compound B compounded, was press-formed to obtain a film-type formed product of the acrylic resin having a thickness of 250 μm. Then, the resultant film-type formed product was used for measuring a surface resistance value in accordance with the method described above. The results are shown in Table 2.

Comparative Example 3

In a vacuum press, 100 parts of the polypropylene resin used in Example 8, as it was, without formation of a layer of a composition for an anti-static agent, was press-formed to obtain a film-type formed product of the polypropylene resin having a thickness of 250 μm. Then, the resultant film-type formed product was used for measuring a surface resistance value in accordance with the method described above. The results are shown in Table 2.

Comparative Example 4

A cross-linkable composition containing a styrene butadiene rubber, a cross-linking agent, and various compounding agents and a sheet-type cross-linked product having a thickness of 250 μm were obtained in the same manner as in Example 9 except that the imidazolium structure-containing polyether compound F was not compounded. Then, the resultant sheet-type cross-linked product was used for measuring a surface resistance value in accordance with the method described above. The results are shown in Table 2.

Comparative Example 5

A cross-linkable composition containing a fluorine rubber, a cross-linking agent, and various compounding agents and a sheet-type cross-linked product having a thickness of 250 μm were obtained in the same manner as in Example 10 except that the imidazolium structure-containing polyether compound F was not compounded. Then, the resultant sheet-type cross-linked product was used for measuring a surface resistance value in accordance with the method described above. The results are shown in Table 2.

Comparative Example 6

An attempt to obtain a film-type laminate was made in the same manner as in Example 8 except that a polypropylene film having a thickness of 300 was coated with 5 parts of an ionic liquid (butylmethylimidazoliumbis(trifluoromethanesulfonyl)imide), instead of the composition for an anti-static agent containing the imidazolium structure-containing polyether compound F and a cross-linking agent, so as to achieve an thickness of 15 μm, but the ionic liquid flowed off, and a film-type laminate was failed to be obtained. Accordingly, measurement of a surface resistance value was also failed.

Comparative Example 7

A cross-linkable composition containing a styrene butadiene rubber, an ionic liquid, a cross-linking agent, and various compounding agent and a sheet-type cross-linked product having a thickness of 250 μm were obtained in the same manner as in Example 9 except that 5 parts of the imidazolium structure-containing polyether compound F was replaced by 5 parts of an ionic liquid (butylmethylimidazoliumbis(trifluoromethanesulfonyl)imide). The resultant sheet-type cross-linked product, on the surface of which the ionic liquid bled out, was an incomplete rubber sheet, and precise measurement of its surface resistance value was failed.

TABLE 1

| | | Example 1 | Example 2 | Example 3 | Example 4 | Example 5 |
|---|---|---|---|---|---|---|
| Sample form | | Formed product | Formed product | Formed product | Formed product | Laminate |
| Resin/rubber | Polyethylene terephthalate resin | 100 parts | 100 parts | 100 parts | 100 parts | 250 μm |
| | Acrylic resin | | | | | |
| | Polypropylene resin | | | | | |
| | Styrene butadiene rubber | | | | | |
| | Fluorine rubber | | | | | |
| Polyether compound having a cationic group | Imidazolium structure-containing polyether compound B | 5 parts | | | | |
| | Imidazolium structure-containing polyether compound C | | 5 parts | | | |
| | Imidazolium structure-containing polyether compound E | | | 20 parts | | |
| | Imidazolium structure-containing polyether compound F | | | | 20 parts | 12 μm |
| Ionic liquid | Ionic liquid | | | | | |
| Surface resistance value (Ω cm (Ohm-cm)) | | $1 \times 10^{6.5}$ | $1 \times 10^{8.5}$ | $1 \times 10^{4.5}$ | $1 \times 10^{7.5}$ | $1 \times 10^{6.8}$ |

TABLE 1-continued

|  |  | Example 6 | Example 7 | Example 8 | Example 9 | Example 10 |
|---|---|---|---|---|---|---|
|  | Sample form | Formed product | Formed product | Laminate | Cross-linked product | Cross-linked product |
| Resin/rubber | Polyethylene terephthalate resin |  |  |  |  |  |
|  | Acrylic resin | 100 parts | 100 parts |  |  |  |
|  | Polypropylene resin |  |  | 300 μm |  |  |
|  | Styrene butadiene rubber |  |  |  | 100 parts |  |
|  | Fluorine rubber |  |  |  |  | 100 parts |
| Polyether compound having a cationic group | Imidazolium structure-containing polyether compound B | 5 parts |  |  |  |  |
|  | Imidazolium structure-containing polyether compound C |  |  |  |  |  |
|  | Imidazolium structure-containing polyether compound E |  |  |  |  |  |
|  | Imidazolium structure-containing polyether compound F |  | 5 parts | 15 μm | 5 parts | 5 parts |
| Ionic liquid | Ionic liquid |  |  |  |  |  |
|  | Surface resistance value (Ω cm (Ohm-cm)) | $1 \times 10^{6.8}$ | $1 \times 10^{8.6}$ | $1 \times 10^{6.9}$ | $1 \times 10^{8.8}$ | $1 \times 10^{7.9}$ |

TABLE 2

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
|  | Sample form | Formed product | Formed product | Formed product | Cross-linked product | Cross-linked product | Laminate | Cross-linked product |
| Resin/rubber | Polyethylene terephthalate resin | 100 parts |  |  |  |  |  |  |
|  | Acrylic resin |  | 100 parts |  |  |  |  |  |
|  | Polypropylene resin |  |  | 100 parts |  |  | 300 μm |  |
|  | Styrene butadiene rubber |  |  |  | 100 parts |  |  | 100 parts |
|  | Fluorine rubber |  |  |  |  | 100 parts |  |  |
| Polyether compound having a cationic group | Imidazolium structure-containing polyether compound B |  |  |  |  |  |  |  |
|  | Imidazolium structure-containing polyether compound C |  |  |  |  |  |  |  |
|  | Imidazolium structure-containing polyether compound E |  |  |  |  |  |  |  |
|  | Imidazolium structure-containing polyether compound F |  |  |  |  |  |  |  |
| Ionic liquid | Ionic liquid |  |  |  |  |  | 15 μm | 5 parts |
|  | Surface resistance value (Ω cm (Ohm-cm)) | $>1 \times 10^{13}$ | $>1 \times 10^{16}$ | $>1 \times 10^{17}$ | $>1 \times 10^{15}$ | $>1 \times 10^{17}$ | Not measurable | Not measurable |

In Table 1 and Table 2, the compounding ratio of each component is shown for Examples 1 to 4, 6, 7, 9, and 10 and Comparative Examples 1 to 5, 7, and the thickness of each layer shown for Examples 5 and 8, and Comparative Example 6.

As can be confirmed from Table 1, no bleeding-out occurred when an anti-static agent containing a polyether compound having a cationic group was used, specifically, in any of the formed products, cross-linked products, and laminates obtained by combining an anti-static agent containing a polyether compound having a cationic group with a resin or rubber. Further the formed products, cross-linked products, and laminates each had a low surface resistance value and excellent anti-static performance (Examples 1 to 10).

In contrast, when no anti-static agent containing a polyether compound having a cationic group was compounded, the surface resistance value was high, and the anti-static performance was insufficient (Comparative Examples 1 to 5).

When an ionic liquid was used as an anti-static agent, attachment on the formed product constituted by a resin was failed, or compatibility with a rubber was insufficient and thus bleeding out occurred. Thus, such compositions did not serve as an anti-static agent for a resin or rubber (Comparative Examples 6 and 7).

The invention claimed is:

1. A composition for a formed product, wherein the composition is a blend of an anti-static agent containing a polyether compound having a cationic group and a resin and/or rubber formed by blending the anti-static agent and the resin and/or rubber, wherein a content of the polyether compound having a cationic group is 0.1 to 30 parts by weight based on a total of 100 parts by weight of the resin and the rubber.

2. A formed product obtained by forming the composition for a formed product according to claim 1.

3. A cross-linkable composition
wherein the cross-linkable composition is a blend of an anti-static agent containing a polyether compound having a cationic group, a resin and/or rubber, and a cross-linking agent formed by blending the anti-static agent, the resin and/or rubber and the cross-linking agent, wherein
a content of the polyether compound having a cationic group is 0.1 to 30 parts by weight based on a total of 100 parts by weight of the resin and the rubber.

4. A cross-linked product obtained by cross-linking the cross-linkable composition according to claim 3.

5. A laminate comprising a layer of a formed product of a resin and/or rubber and a layer of an anti-static agent formed by cross-linking a composition for an anti-static agent, the composition comprising a polyether compound having a cationic group and a cross-linking agent, wherein
a thickness of the layer of the formed product of the resin and/or rubber is 10 to 1,000 μm and a thickness of the layer of the anti-static agent is 0.01 to 100 μm.

6. The composition for a formed product according to claim 1, wherein the polyether compound having a cationic group includes a monomer unit represented by the following general formula (1):

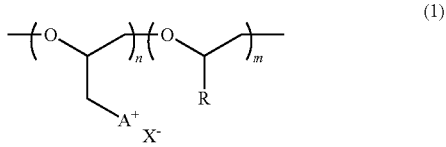

(1)

wherein $A^+$ represents a cationic group or cationic group-containing group, $X^-$ represents an arbitrary counter anion, R represents a non-ionic group, "n" is an integer of 2 or more, "m" is an integer of 0 or more, and "n+m" is an integer of 5 to 1000.

7. The composition for a formed product according to claim 1, wherein the resin and/or rubber are at least one of selected from the group consisting of polyethylene terephthalate resin, acrylic resin, styrene butadiene rubber, and fluorine rubber.

8. The cross-linkable composition according to claim 3, wherein the polyether compound having a cationic group includes a monomer unit represented by the following general formula (1):

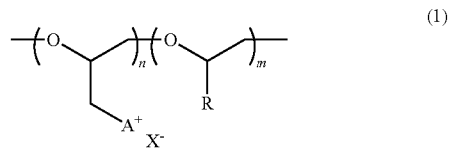

(1)

wherein $A^+$ represents a cationic group or cationic group-containing group, $X^-$ represents an arbitrary counter anion, R represents a non-ionic group, "n" is an integer of 2 or more, "m" is an integer of 0 or more, and "n+m" is an integer of 5 to 1000.

9. The cross-linkable composition according to claim 3, wherein the resin and/or rubber are at least one of selected from the group consisting of polyethylene terephthalate resin, acrylic resin, styrene butadiene rubber, and fluorine rubber.

10. The laminate according to claim 5, wherein the polyether compound having a cationic group includes a monomer unit represented by the following general formula (1):

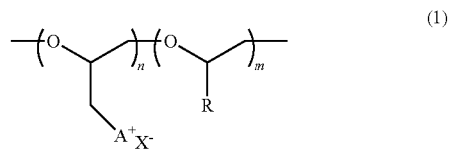

(1)

wherein $A^+$ represents a cationic group or cationic group-containing group, $X^-$ represents an arbitrary counter anion, R represents a non-ionic group, "n" is an integer of 2 or more, "m" is an integer of 0 or more, and "n +m" is an integer of 5 to 1000.

11. The laminate according to claim 5, wherein the resin and/or rubber are at least one of selected from the group consisting of polyethylene terephthalate resin, acrylic resin, styrene butadiene rubber, and fluorine rubber.

* * * * *